(12) United States Patent
Liu et al.

(10) Patent No.: US 11,298,752 B2
(45) Date of Patent: Apr. 12, 2022

(54) LATHE FIXTURE FOR MACHINING HUB

(71) Applicant: CITIC Dicastal Co., Ltd., Qinhuangdao (CN)

(72) Inventors: Xiao Liu, Qinhuangdao (CN); Jingru Shen, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 149 days.

(21) Appl. No.: 16/817,581

(22) Filed: Mar. 12, 2020

(65) Prior Publication Data
US 2020/0298320 A1 Sep. 24, 2020

(30) Foreign Application Priority Data
Mar. 18, 2019 (CN) .......................... 201910202989.7

(51) Int. Cl.
*B23B 31/14* (2006.01)

(52) U.S. Cl.
CPC .......... *B23B 31/14* (2013.01); *B23B 2215/08* (2013.01); *Y10T 279/243* (2015.01)

(58) Field of Classification Search
CPC .. B23B 31/14; B23B 2215/08; Y10T 279/243
See application file for complete search history.

(56) References Cited

U.S. PATENT DOCUMENTS

| 4,240,645 | A | * | 12/1980 | Rohm | B23B 31/14 279/121 |
| 4,431,201 | A | * | 2/1984 | Morisaki | B23B 31/14 279/110 |
| 4,508,357 | A | * | 4/1985 | Reich | B23B 31/16287 279/130 |
| 4,521,028 | A | * | 6/1985 | Hiestand | B23B 31/14 279/121 |
| 4,645,219 | A | * | 2/1987 | Link | B23B 31/14 279/118 |
| 10,525,533 | B2 | * | 1/2020 | Liu | B23B 31/16229 |
| 2017/0312833 | A1 | * | 11/2017 | Guo | B23B 31/16275 |
| 2019/0321939 | A1 | * | 10/2019 | Liu | B23Q 3/062 |

* cited by examiner

*Primary Examiner* — Eric A. Gates
(74) *Attorney, Agent, or Firm* — IPro, PLLC

(57) ABSTRACT

A lathe fixture for machining a hub is characterized in that a power chuck (10) is installed inside a base (5), a positioning connecting block (6) is installed on the power chuck (10), a fan-shaped claw (7) is installed on the positioning connecting block (6), a pressing block (18) is installed on the base (5), and a first support plate (16) is arranged; the shell (2) is arranged in a back cavity of the base (5) from bottom to top, the force transmission shaft (4) penetrates through the base (5), the force transmission rod (3) is fixedly arranged in a groove of the shell (2), the first support plate (16) and the second support plate (14) are respectively arranged at the front end and the rear end of the shell (2), the balance block (15) is fixed between the first support plate (16) and the second support plate (14) through two guide posts (17), the spring (13) is arranged in the groove of the balance block (15) and the second support plate (14), and the cover plate (1) is fixedly arranged at the lower end of the shell (2); the invention provides a clamp with a centrifugal force compensation mechanism.

3 Claims, 7 Drawing Sheets

LATHE FIXTURE FOR MACHINING HUB

TECHNICAL FIELD

The invention relates to a lathe fixture, in particular to a fixture for machining an automobile hub.

BACKGROUND

At present, all general wheel hub processing technologies need to be processed through three sequences, the first sequence and the second sequence are usually completed on a vertical lathe or a horizontal lathe, the third sequence is completed through a vertical processing center with a fourth shaft, a three-sequence clamp does not rotate along with a main shaft, the problem of clamping force loss does not exist, a two-sequence clamp and a machine tool main shaft move and rotate together, along with the increasing of the rotating speed, the centrifugal force of a clamping part on the clamp can be increased, the clamping force provided by the clamping part is smaller than the clamping force which can be provided in a static state, a proper centrifugal force compensation mechanism is designed, the stability of the clamping force can be guaranteed, and the safety of machining clamping is further guaranteed. In addition, if the mass of the clamp is too large, great inertia can be generated, so that great pressure is applied to a speed reducing system of the machine tool when the main shaft is stopped from high speed, and the service life of the speed reducing mechanism is shortened.

SUMMARY

The invention aims to provide a hub machining lathe clamp with a centrifugal force compensation mechanism.

A lathe fixture for processing a wheel hub, comprising a cover plate, a shell, a force transmission rod, a force transmission shaft, a base, positioning connecting blocks, fan-shaped claws, a power chuck, a spring, second support plate, a balance block, first support plate, guide posts, a pressing block and a linkage screw passing through the base for linkage mounting with a machine tool main shaft, the power chuck is mounted inside the base, the positioning connecting blocks are mounted on the power chuck, the fan-shaped claws are mounted on the positioning connecting blocks, and the pressing block is fixedly mounted on the base.

A centrifugal force compensation mechanism comprising a shell, a force transmission rod, a force transmission shaft, a spring, a second support plate, a balance block, and first support plate; wherein the shell is mounted in a back cavity of the base from bottom to top, the force transmission shaft passes through the base, the force transmission rod is fixedly mounted in a groove of the shell, the first support plate and the second support plate are respectively placed at the front and rear ends of the shell, the balance block is fixed between the first support plate and the second support plate through two guide posts, the spring is placed in grooves on the balance block and the second support plate, and the cover plate is fixedly mounted at the lower end of the shell.

The back cavity of the base is disposed in an open type, and a base limiting part on the base gets the centrifugal force compensation mechanism stuck.

The number of the positioning connecting blocks is six, and the number of the fan-shaped claws is six; a protection ring is fixedly mounted at a gap between the power chuck and the base, and the first O-shaped ring and second O-shaped ring are mounted in a groove on the protection ring; and The lower surface of the base is evenly distributed with six base reinforcing ribs, six base windows are evenly distributed on the base, a positioning connecting block force transmission bump on the positioning connecting block passes through the base window and enters the interior of a shell groove, one end of the force transmission rod can be in mutual contact with the positioning connecting block transmission bump, and the number of each set of base screw holes on the base is ten.

42CrMoV is adopted as the material of the force transmission rod and the force transmission shaft, and No. 45 steel is adopted as the shell material of the balance block, and the balance block is filled with a lead material inside; the first support plate and the second support plate are of the same height and in clearance fit with an internal height direction of the shell, a degree of freedom for moving the balance block up, down, left and right is defined, and two guide posts make the balance block move only in a radial direction of the fixture.

In practical use, the clamp is used for clamping the inner rim of the hub, machining the front face of the hub and the outer rim, after the hub is placed on the fan-shaped claws of the clamp, the fan-shaped claws gradually shrink towards the center along with the power chuck in the radial direction until the hub is positioned and tightened, the centrifugal force of the fan-shaped claws and the positioning connecting block is increased along with the increasing rotation speed of the spindle, the lost clamping force is increased, at the moment, the balance block compensates the lost centrifugal force to the fan-shaped claws and the positioning connecting block through the force transfer rod, and the stability of the value of the clamping force is ensured.

The invention has the technical characteristics and the optimal selection characteristic in practical use, has simple structure and convenient maintenance, overcomes the defect of overlarge weight of the traditional clamp, and realizes lightweight design.

BRIEF DESCRIPTION OF FIGURES

Hereinafter, embodiments of the present invention will be described in detail with reference to the accompanying drawings.

Figure 1:
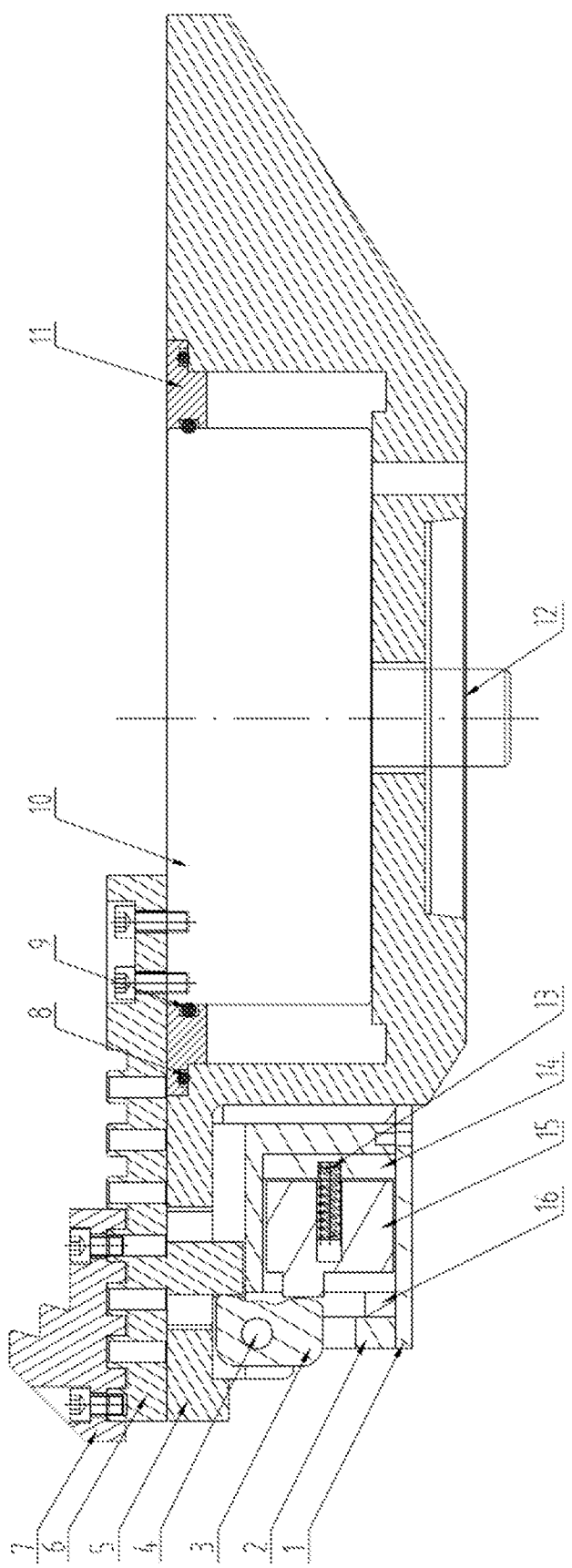
FIG. 1 is a front view of a Lathe fixture for processing a wheel hub of the present invention.
Figure 2:
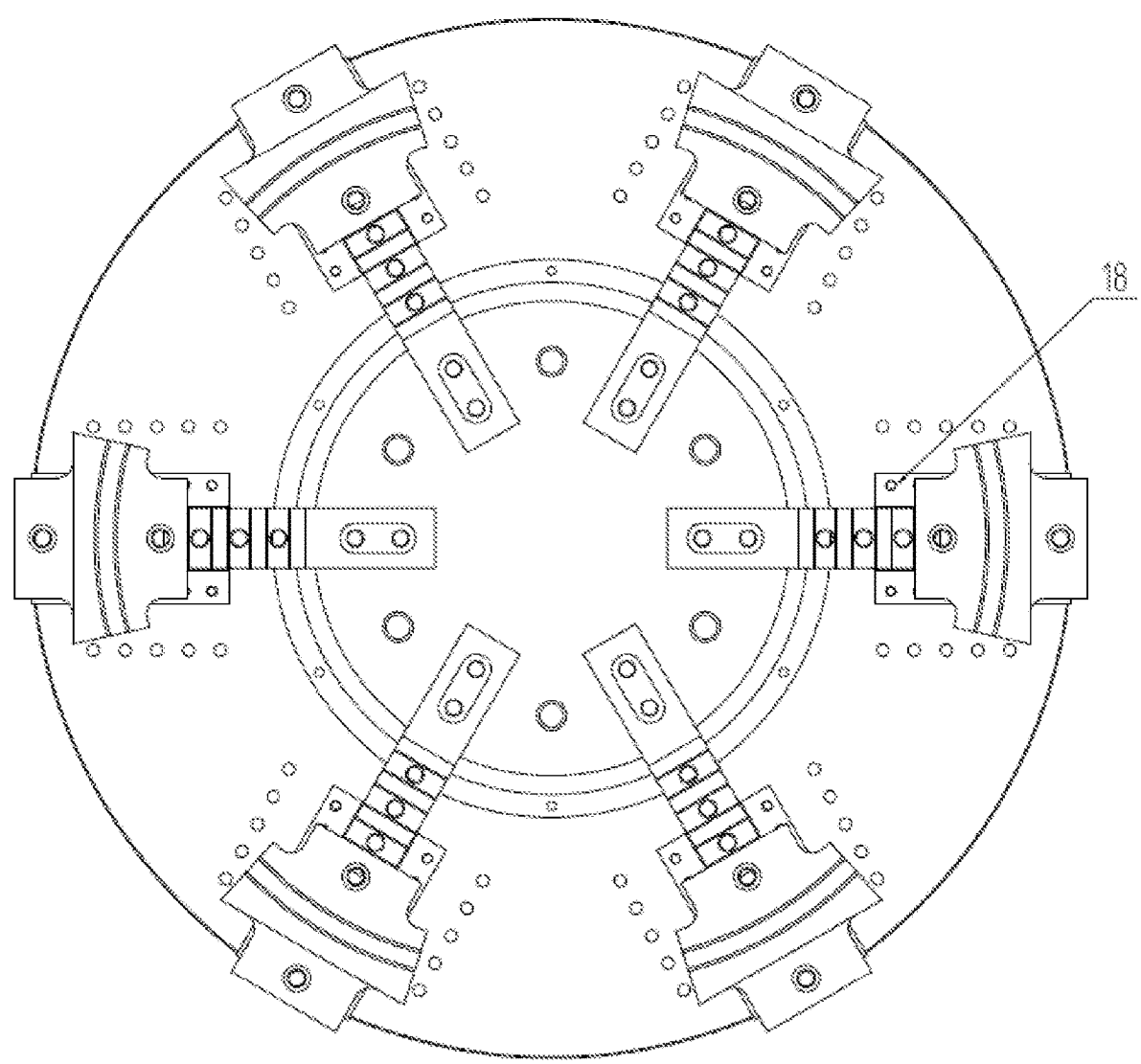
FIG. 2 is a top view of a Lathe fixture for processing a wheel hub of the present invention.
Figure 3:
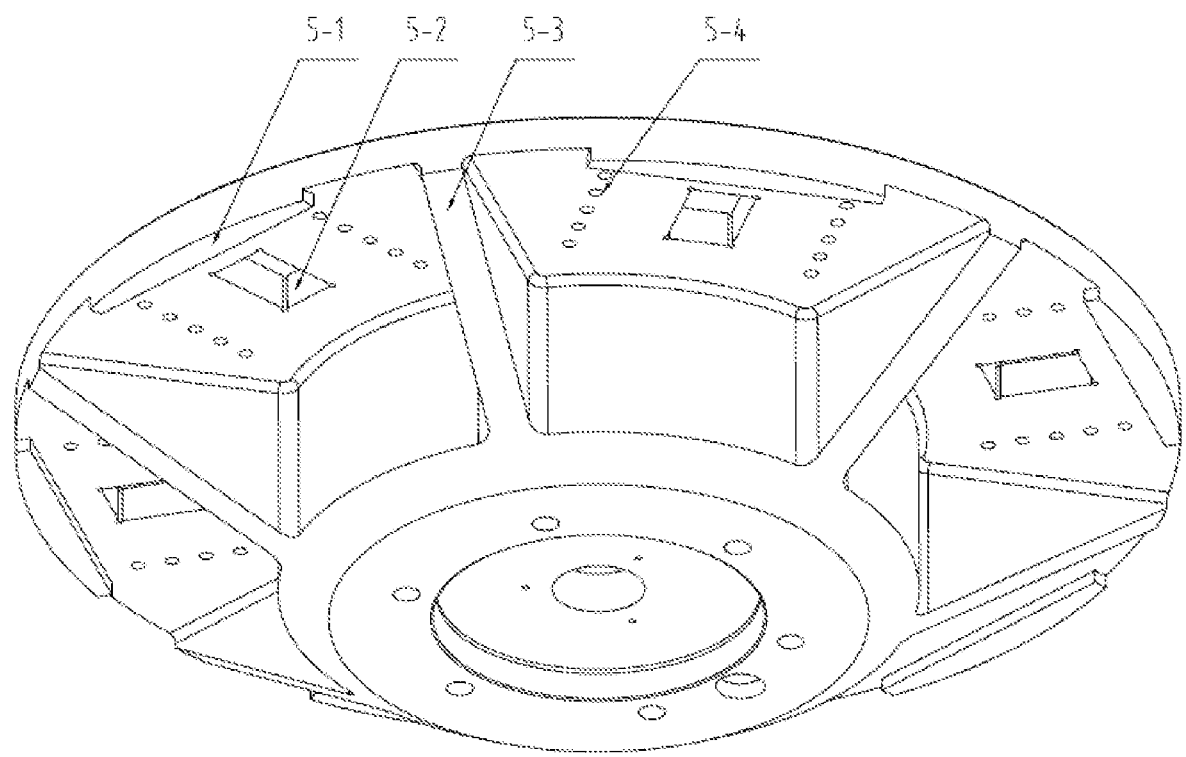
FIG. 3 is a perspective view of a base of a Lathe fixture for processing a wheel hub of the present invention.
Figure 4:
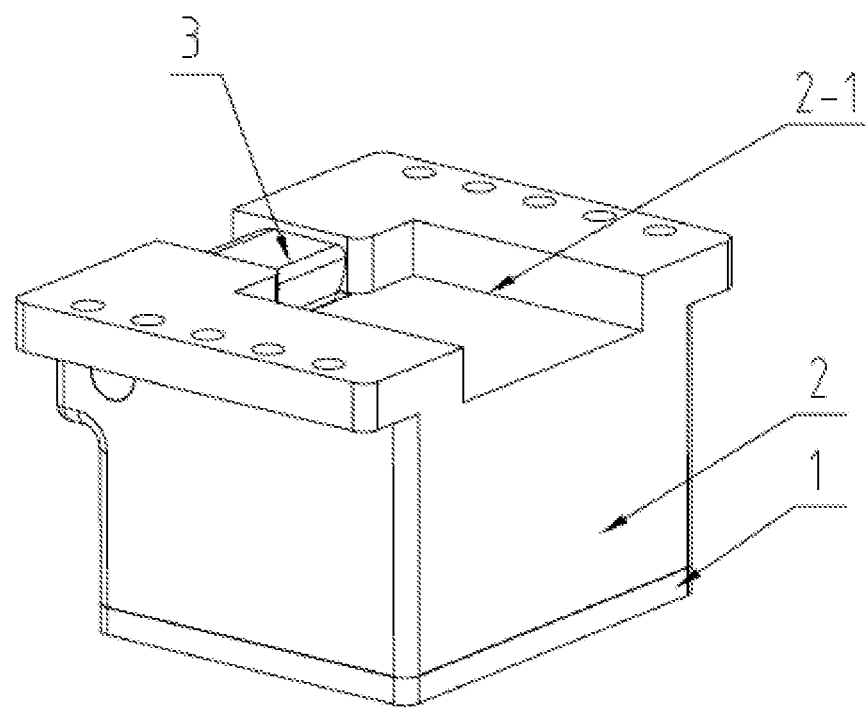
FIG. 4 is a perspective view of the centrifugal force compensation mechanism stuck.
Figure 5:
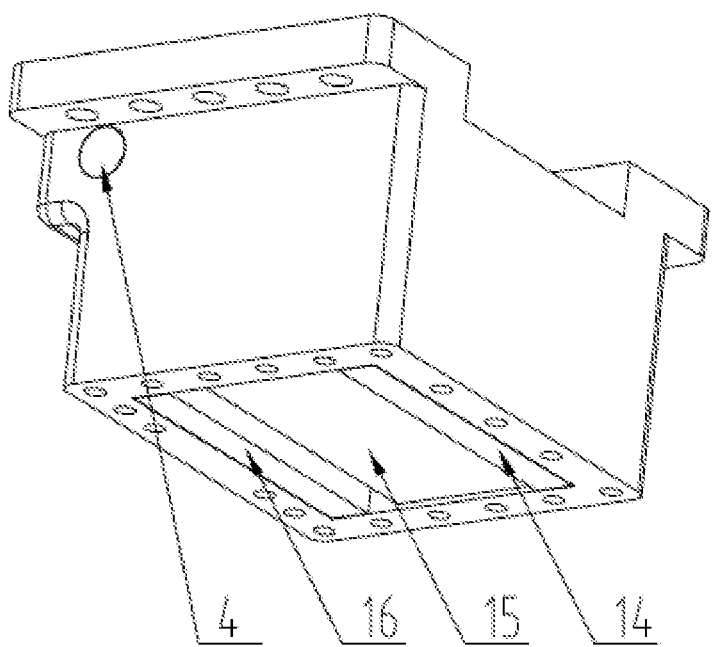
FIG. 5 is a perspective view of the centrifugal force compensation mechanism stuck.
Figure 6:
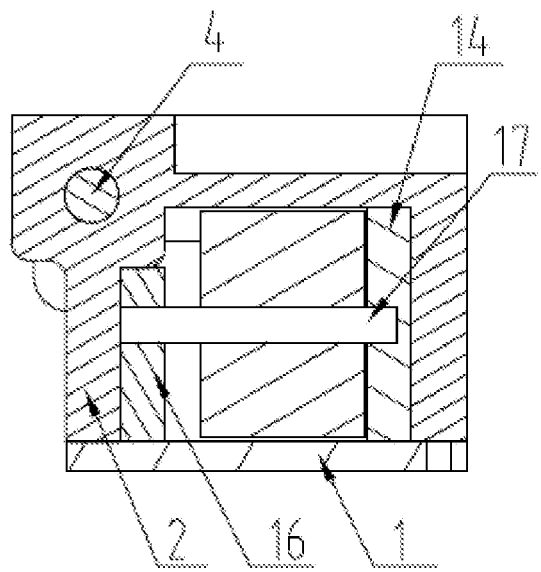
FIG. 6 is a sectional view of the centrifugal force compensation mechanism stuck of the present invention.
Figure 7:
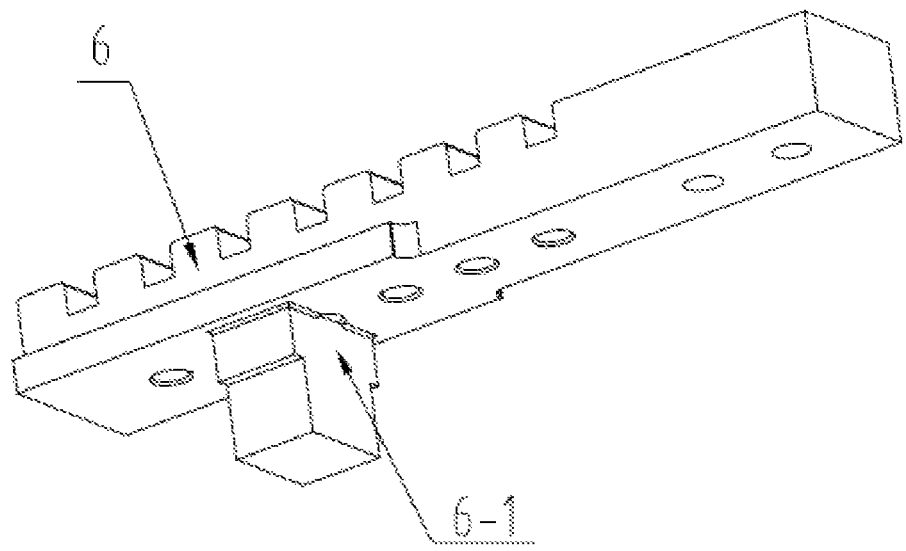
FIG. 7 is a perspective view of the positioning connecting block of the present invention.

In the figure: cover plate 1, shell 2, force transmission rod 3, force transmission shaft 4, base 5, positioning connecting blocks 6, fan-shaped claws 7, first O-shaped ring 8, second O-shaped ring 9, power chuck 10, protection ring 11, linkage screw 12, spring 13, second support plate 14, balance block 15, first support plate 16, guide posts 17, pressing block 18.

In addition, for clarity of description, local features on several parts are as follows: shell groove 2-1, base limiting part 5-1, base windows 5-2, base reinforcing ribs 5-3, base screw holes 5-4, force transmission bump 6-1.

DETAILED DESCRIPTION

Example 1

The following provides a more detailed description of embodiments of the present invention, with reference to the accompanying drawings.

The utility model provides a Lathe fixture for processing a wheel hub, includes cover plate 1, shell 2, force transmission rod 3, force transmission shaft 4, base 5, location connecting block 6, fan-shaped claw 7, first O-shaped ring 8, second O-shaped ring 9, power chuck 10, protection ring 11, linkage screw 12, spring 13, second support plate 14, balance block 15, first support plate 16, guide post 17, pressing block 18.

The linkage screw 12 penetrates through the base 5 to be connected and installed with a machine tool spindle, the power chuck 10 is installed inside the base 5 through threaded connection, six positioning connecting blocks 6 are installed on the power chuck 10 through threaded connection, six fan-shaped claws 7 are respectively installed on the positioning connecting blocks 6 through threaded connection, the pressing block 18 is fixedly installed on the base 5 through threaded connection, the protection ring 11 is fixedly installed in a gap between the power chuck 10 and the base 5 through threaded connection, the first O-shaped ring 8 and second O-shaped ring 9 are installed in a groove on the protection ring 11, the shell 2 is installed in a back cavity of the base 5 from bottom to top through threaded connection, the force transmission shaft 4 penetrates through the base 5 to install and fix the force transmission rod 3 in the groove of the shell 2, the first support plate 16 and the second support plate 14 are respectively placed at the front end and the rear end of the shell 2, and the balance block 15 is fixed between the first support plate 16 and the second support plate 14 through two guide posts 17, the spring 13 is placed in a groove on the balance block 15 and the second support plate 14, and the cover plate 1 is fixedly arranged at the lower end of the shell 2 through screw connection.

Preferably, the back cavity of the base 5 adopts an open structure, so that compared with the base of a conventional clamp, the weight of the clamp is reduced, and the light weight of the clamp is facilitated; the base limiting part 5-1 on the base 5 structurally ensures that the centrifugal force compensation mechanism cannot be thrown out of the back cavity of the base 5 by excessive centrifugal force, so that the whole fixture is ensured to be stably and reliably installed; six base reinforcing ribs 5-3 are uniformly distributed on the lower surface of the base 5 and used for reinforcing rigidity, compensating rigidity loss caused by lightweight design and ensuring that the whole clamp has enough rigidity; six base windows 5-2 are uniformly distributed on the base 5, a force transmission bump 6-1 of a positioning connecting block on the positioning connecting blocks 6 penetrates through the base windows 5-2 and enters the shell groove 2-1 of the shell, one end of a force transmission rod 3 can be in contact with the force transmission bump 6-1 of the positioning connecting block, and ten base screw holes 5-4 on the base are formed in each group, so that the safety of the centrifugal force compensation mechanism is further ensured; the materials of the force transmission rod 3 and force transmission shaft 4 adopt 42CrMoV, so that sufficient strength is ensured; the inner space of the shell 2 is limited, in order to ensure that the weight of balance block 15 reaches the designed weight, the shell material of the weight of balance block 15 adopts No. 45 steel, and the inside of the shell material is filled with lead material to increase the total weight; the height of first support plate 16 and height of second support plate 14 are the same, and are clearance fit with the inside direction of height of shell 2, restrict balance block 15 about and the degree of freedom that moves, make balance block 15 can only remove in anchor clamps radial direction through two guide posts 17, and this kind of installation scheme makes when centrifugal force compensating mechanism maintains the maintenance, and it is comparatively convenient that the installation is dismantled, and cannot lose the anchor clamps precision.

In practical use, the clamp is used for clamping the inner rim of a hub, machining the front face of the hub and the outer rim, after the hub is placed on the fan-shaped claws 7 of the clamp, the fan-shaped claws 7 gradually shrink towards the center along with the power chuck 10 in the radial direction until the hub is positioned and fastened, the centrifugal force of the fan-shaped claws 7 and the positioning connecting blocks 6 is increased along with the increasing rotation speed of a main shaft, the lost clamping force is increased, and at the moment, the weight of balance block 15 compensates the lost centrifugal force to the fan-shaped claws 7 and the positioning connecting blocks 6 through the force transmission rod 3, so that the stability of the value of the clamping force is ensured. The invention has the technical characteristics and the optimal selection characteristic in practical use, has simple structure and convenient maintenance, overcomes the defect of overlarge weight of the traditional clamp, and realizes lightweight design.

What is claimed is:

1. A lathe fixture for processing a wheel hub, comprising a centrifugal force compensation mechanism, a cover plate (1), a base (5), positioning connecting blocks (6), fan-shaped claws (7), a power chuck (10), guide posts (17), a pressing block (18) and a linkage screw (12) passing through the base (5) for linkage mounting with a machine tool main shaft, characterized in that the power chuck (10) is mounted inside the base (5), the positioning connecting blocks (6) are mounted on the power chuck (10), the fan-shaped claws (7) are mounted on the positioning connecting blocks (6), and the pressing block (18) is fixedly mounted on the base (5);

the centrifugal force compensation mechanism including a shell (2), a force transmission rod (3), a force transmission shaft (4), a spring (13), a second support plate (14), a balance block (15), and a first support plate (16); wherein the shell (2) is mounted in a back cavity of the base (5) from bottom to top, the force transmission shaft (4) passes through the base (5), the force transmission rod (3) is fixedly mounted in a groove of the shell (2), the first support plate (16) and the second support plate (14) are respectively placed at the front and rear ends of the shell (2), the balance block (15) is fixed between the first support plate (16) and the second support plate (14) through two guide posts (17), the spring (13) is placed in grooves on the balance block (15) and the second support plate (14), and the cover plate (1) is fixedly mounted at the lower end of the shell (2); and the back cavity of the base (5) is open, and a base limiting part (5-1) on the base (5) is used to fix the centrifugal force compensation mechanism.

2. The lathe fixture for processing a wheel hub according to claim 1, characterized in that the number of the positioning connecting blocks (6) is six, and the number of the fan-shaped claws (7) is six; a protection ring (11) is fixedly mounted at a gap between the power chuck (10) and the base (5), and a first O-shaped ring (8) and a second O-shaped ring (9) are mounted in a groove on the protection ring (11); and the lower surface of the base (5) is evenly distributed with six base reinforcing ribs (5-3), six base windows (5-2) are evenly distributed on the base (5), a force transmission bump (6-1) on the positioning connecting block (6) passes through the base window (5-2) and enters the interior of a shell groove (2-1), one end of the force transmission rod (3) can be in mutual contact with the force transmission bump (6-1).

3. The lathe fixture for processing a wheel hub according to claim 1, characterized in that 42CrMoV is adopted as the material of the force transmission rod (3) and the force transmission shaft (4), and No. 45 steel is adopted as the shell material of the balance block (15), and the balance block is filled with a lead material inside; the first support plate (16) and the second support plate (14) are of the same height and in clearance fit with an internal height direction of the shell (2), a degree of freedom for moving the balance block (15) up, down, left and right is defined, and two guide posts (17) make the balance block (15) move only in a radial direction of the fixture.

\* \* \* \* \*